United States Patent
Du et al.

(10) Patent No.: US 9,991,807 B2
(45) Date of Patent: Jun. 5, 2018

(54) APPARATUS AND METHOD FOR DRIVING SYNCHRONOUS RECTIFIER

(71) Applicant: ZTE CORPORATION, Shenzhen, Guangdong Province (CN)

(72) Inventors: Fengfu Du, Shenzhen (CN); Jie Fan, Shenzhen (CN); Yaoguang Gao, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 46 days.

(21) Appl. No.: 14/916,086

(22) PCT Filed: May 7, 2014

(86) PCT No.: PCT/CN2014/076975
§ 371 (c)(1),
(2) Date: Mar. 31, 2016

(87) PCT Pub. No.: WO2014/180314
PCT Pub. Date: Nov. 13, 2014

(65) Prior Publication Data
US 2016/0218634 A1    Jul. 28, 2016

(30) Foreign Application Priority Data

Sep. 3, 2013  (CN) .......................... 2013 1 0395156

(51) Int. Cl.
*H02M 3/335* (2006.01)
*H02M 7/217* (2006.01)

(52) U.S. Cl.
CPC ... *H02M 3/33546* (2013.01); *H02M 3/33592* (2013.01); *H02M 7/217* (2013.01); *Y02B 70/1475* (2013.01)

(58) Field of Classification Search
CPC .. H02M 3/33592; H02M 7/217; H02M 3/157; H02M 3/33507; H02M 3/33515;
(Continued)

(56) References Cited

U.S. PATENT DOCUMENTS

| | | | |
|---|---|---|---|
| 2006/0002160 A1* | 1/2006 | Nalbant | H02M 3/33569 363/97 |
| 2007/0058402 A1* | 3/2007 | Shekhawat | H02M 1/42 363/89 |

FOREIGN PATENT DOCUMENTS

| | | |
|---|---|---|
| CN | 101170280 A | 4/2008 |
| CN | 101527525 A | 9/2009 |

(Continued)

OTHER PUBLICATIONS

International Search Report (Form PCT/ISA/210) for International Application No. PCT/CN2014/076975 dated Jul. 30, 2014.

(Continued)

*Primary Examiner* — Henry Lee, III
(74) *Attorney, Agent, or Firm* — Koppel, Patrick, Heybl & Philpott (57) ABSTRACT

Provided is apparatus and a method for driving synchronous rectifiers, which relate to the field of power supplies for communications. The apparatus includes: detection circuits, wherein each of the detection circuits is configured to detect drain and source voltages of one of synchronous rectifiers to obtain a detection signal for indicating a current direction in the one of the synchronous rectifiers; an isolated driving circuit, configured to generate isolated driving signals for driving the synchronous rectifiers according to the detection signals output by the detection circuits; and the synchronous rectifiers, configured to synchronously rectify input signals from a main transformer by using the isolated driving signals. The present disclosure can obtain the isolated driving signals of the synchronous rectifiers simply and effec- (Continued)

tively, and has a superior protective feature in case of shoot-through and other abnormalities.

8 Claims, 3 Drawing Sheets

(58) Field of Classification Search
CPC ......... H02M 3/33546; H02M 3/33569; H02M 3/337; H02M 7/219; H02M 7/53871; H02M 7/53873; Y02B 70/1475; H02P 25/16

See application file for complete search history.

(56) References Cited

FOREIGN PATENT DOCUMENTS

| | | |
|---|---|---|
| CN | 101902136 A | 12/2010 |
| CN | 102263509 A | 11/2011 |
| EP | 2200164 | 6/2010 |

OTHER PUBLICATIONS

European Search Report, Application No. 14794972.1, dated Sep. 30, 2016.

\* cited by examiner

APPARATUS AND METHOD FOR DRIVING SYNCHRONOUS RECTIFIER

TECHNICAL FIELD

The present disclosure relates to the field of power supplies for communications, and in particular to a driving apparatus for LLC resonant converter synchronous rectifier and a relevant driving method.

BACKGROUND

In order to meet high-efficiency and high-power density requirements, a resonant converter is widely applied to a Direct Current (DC)-DC power converter. However, due to the fact that a secondary-side rectification diode may cause a quite high conduction loss, a circuit composed of rectification diodes is replaced by a rectifier circuit composed of transistors, and the rectifier circuit is applied to the resonant converter. Compared with a conversion circuit adopting the rectification diodes, the circuit adopting the transistors for rectification can reduce a power loss. A conventional synchronous rectifier control method is as follows:

1, a current flowing through a secondary-side synchronous rectifier parasitic diode is detected by using a current transformer, a synchronous rectifier is turned on when it is detected that the current flows, however, due to the fact that the current transformer has parasitic inductance, a current signal and a turn-on signal are likely to delay, and the current transformer is likely to be interfered, thereby increasing the cost and the size; and 2, a control signal of the synchronous rectifier is the same as or different from that of a main power mosfet, and a driving signal of a synchronous driving tube, serving as a control signal of the synchronous rectifier, is relatively easy to obtain, but when the synchronous rectifier works in a discontinuous current mode, the control signal of the synchronous rectifier is relatively difficult to acquire, and if a signal which is the same as or different from that of the main power mosfet is directly adopted, the problems of reverse current flowing and the like will be caused so as to seriously affect the working of the circuit.

SUMMARY

An embodiment of the present disclosure is intended to provide apparatus and a method for driving synchronous rectifiers, which may better solve the problem how to obtain isolated driving signals of the synchronous rectifiers simply and effectively.

According to one aspect of the embodiment of the present disclosure, apparatus for driving synchronous rectifiers is provided, which may include:

detection circuits configured to detect drain and source voltages of the synchronous rectifiers to obtain detection signals for indicating current directions in the synchronous rectifiers;

an isolated driving circuit configured to generate isolated driving signals for driving the synchronous rectifiers according to the detection signals output by the detection circuits; and the synchronous rectifiers configured to synchronously rectify input signals from a main transformer by using the isolated driving signals.

Preferably, the apparatus may include two synchronous rectifiers, each of the two synchronous rectifiers being connected to a secondary winding of the main transformer and one of the detection circuits.

Preferably, the isolated driving circuit may include two push-pull circuits and an isolated driving transformer, wherein an input end of each of the two push-pull circuits may be connected to one of the detection circuits; and a primary winding of the isolated driving transformer may be connected to output ends of the two push-pull circuits, and each of two secondary windings of the isolated driving transformer may be connected to a gate and source of one of synchronous rectifiers.

Preferably, the apparatus may include a full-bridge rectifier circuit formed by four synchronous rectifiers, input ends of the full-bridge rectifier circuit may be connected to the secondary windings of the main transformer, and a synchronous rectifier, of which the source is grounded, in the two synchronous rectifiers in each input branch circuit of the full-bridge rectifier circuit may be connected to one of the detection circuits.

Preferably, the isolated driving circuit may include two push-pull circuits and an isolated driving transformer, wherein an input end of each of the two push-pull circuits may be connected to the one of the detection circuit; and a primary winding of the isolated driving transformer may be connected to output ends of the two push-pull circuits, and each of four secondary windings of the isolated driving transformer may be connected to a gate and source of the one of the synchronous rectifier.

Preferably, each of the detection circuits may include:

a comparison circuit, an input end thereof being connected to a drain and source of the one of the synchronous rectifiers; and an amplification circuit, an input end thereof being connected to the comparison circuit, an output end thereof being connected to one of the two push-pull circuits.

Preferably, the comparison circuit may include a first comparison branch circuit and a second comparison branch circuit, and one end of the first comparison branch circuit and one end of the second comparison branch circuit may be connected to an auxiliary power supply via a first resistor, wherein the first comparison branch circuit may include:

a first triode, a base and collector thereof being connected to the drain of the one of the synchronous rectifiers;

a first diode, a cathode thereof being connected to an emitter of the first triode, an anode thereof being connected to the first resistor;

the second comparison branch circuit may include:

a second triode, a base thereof being connected to the source of the one of the synchronous rectifiers, a collector thereof being connected to the amplification circuit; and a second diode, a cathode thereof being connected to an emitter of the second triode, an anode thereof being connected to the first resistor.

According to another aspect of the embodiment of the present disclosure, a method for driving synchronous rectifiers is provided, which may include that:

detection signals for indicating current directions in the synchronous rectifiers are obtained respectively by detecting drain and source voltages of the synchronous rectifiers;

isolated driving signals for driving the synchronous rectifiers are generated according to the obtained detection signals; and input signals from a main transformer are synchronously rectified by using the isolated driving signals.

Preferably, the step that the detection signals for indicating the current directions in the synchronous rectifiers are obtained may include that:

the drain and source voltages of each of the synchronous rectifiers are compared by using a comparison circuit; and
an output of the comparison circuit is amplified by using an amplification circuit to obtain the detection signal for indicating the current direction in the each of the synchronous rectifiers.

Preferably, the step that the isolated driving signals for driving the synchronous rectifiers are generated may include that:

the detection signals are output to an isolated driving transformer in a push-pull way by using a push-pull circuit, in order that the isolated driving transformer generates the isolated driving signals for driving the synchronous rectifiers.

Compared with the traditional art, the embodiment of the present disclosure has beneficial effects as follows.

The embodiment of the present disclosure can obtain the isolated driving signals of the synchronous rectifier simply and effectively, and has a superior protective feature in case of shoot-through and other abnormalities.

DETAILED DESCRIPTION OF THE EMBODIMENTS

The preferred embodiments of the present disclosure are described below with reference to the drawings in detail. It should be understood that the preferred embodiments described below are only intended to describe and explain the present disclosure, and do not limit the present disclosure.

Figure 1:
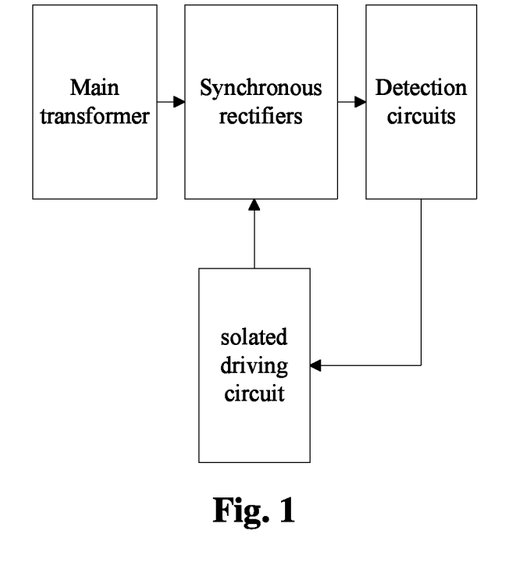
FIG. 1 is a block diagram of apparatus for driving synchronous rectifiers provided by an embodiment of the present disclosure.

FIG. 1 is a block diagram of apparatus for driving synchronous rectifiers provided by an embodiment of the present disclosure. As shown in FIG. 1, the apparatus includes detection circuits, an isolated driving circuit, synchronous rectifiers and a main transformer. each detection circuit detects drain and source voltages of one of the synchronous rectifiers to obtain a detection signal for indicating a current direction in the one of the synchronous rectifiers; the isolated driving circuit generates isolated driving signals for driving the synchronous rectifiers according to the detection signals output by the detection circuits; and the synchronous rectifiers synchronously rectifies input signals from the main transformer by using the isolated driving signal.

Preferably, the main transformer of the apparatus is provided with two secondary windings.

The apparatus includes two synchronous rectifiers, each being connected to the corresponding secondary winding of the main transformer and a detection circuit. At this time, the isolated driving circuit comprises two push-pull circuits and an isolated driving transformer, an input end of each of the two push-pull circuits is connected to a detection circuit, a primary winding of the isolated driving transformer is connected to output ends of the two push-pull circuits, and each of two secondary windings of the isolated driving transformer is connected to a gate and source of the corresponding synchronous rectifier.

Preferably, the main transformer of the apparatus is provided with a primary winding.

The apparatus comprises a full-bridge rectifier circuit formed by four synchronous rectifiers, input ends of the full-bridge rectifier circuit are connected to the secondary windings of the main transformer, and the synchronous rectifier, of which the sound is grounded, in the two synchronous rectifiers of each input branch circuit is connected to a detection circuit. At this time, the isolated driving circuit comprises two push-pull circuits and an isolated driving transformer, an input end of each of the two push-pull circuits is connected to a detection circuit, a primary winding of the isolated driving transformer is connected to output ends of the two push-pull circuits, and each of four secondary windings of the isolated driving transformer is connected to a gate and source of a synchronous rectifier.

The detection circuit includes:

a comparison circuit, an input end thereof being connected to a drain and source of the synchronous rectifier; and
an amplification circuit, an input end thereof being connected to the comparison circuit, an output end thereof being connected to the two push-pull circuits.

Preferably, the comparison circuit includes a first comparison branch circuit and a second comparison branch circuit, and one end of the first comparison branch circuit and one end of the second comparison branch circuit are connected to an auxiliary power supply via a first resistor, wherein the first comparison branch circuit includes:
a first triode, a base and collector thereof being connected to the drain of the synchronous rectifier;
a first diode, a cathode thereof being connected to an emitter of the first triode, an anode thereof being connected to the first resistor;

the second comparison branch circuit includes:
a second triode, a base thereof being connected to the source of the synchronous rectifier, a collector thereof being connected to the amplification circuit; and
a second diode, a cathode thereof being connected to an emitter of the second triode, an anode thereof being connected to the first resistor.

Figure 2:
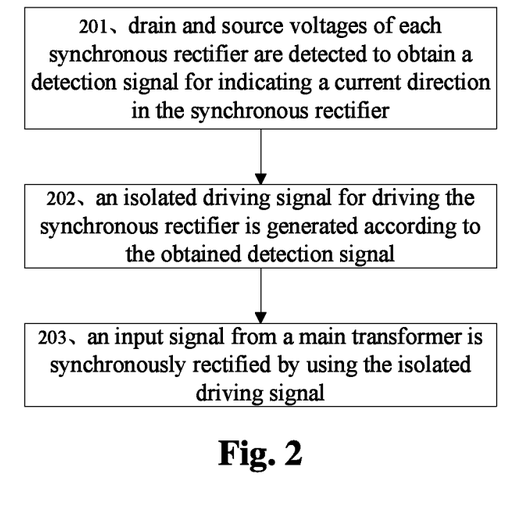
FIG. 2 is a principal block diagram of a method for driving synchronous rectifiers provided by an embodiment of the present disclosure.

FIG. 2 is a principal block diagram of a method for driving synchronous rectifiers provided by an embodiment of the present disclosure. As shown in FIG. 2, the method includes the steps as follows.

Step 201: drain and source voltages of each synchronous rectifier are detected to obtain a detection signal for indicating a current direction in the synchronous rectifier.

The step that the detection signal for indicating the current direction in the synchronous rectifier is obtained includes that: the drain and source voltages of the synchronous rectifier are compared by using a comparison circuit; and an output of the comparison circuit is amplified by using an amplification circuit to obtain the detection signal for indicating the current direction in the synchronous rectifier.

Step 202: an isolated driving signal for driving the synchronous rectifier is generated according to the obtained detection signal.

The step that the isolated driving signal for driving the synchronous rectifier is generated includes that: the detection signal is output to an isolated driving transformer in a push-pull way by using a push-pull circuit, in order that the isolated driving transformer generates the isolated driving signal for driving the synchronous rectifier.

Step 203: an input signal from a main transformer is synchronously rectified by using the isolated driving signal.

Figure 3:
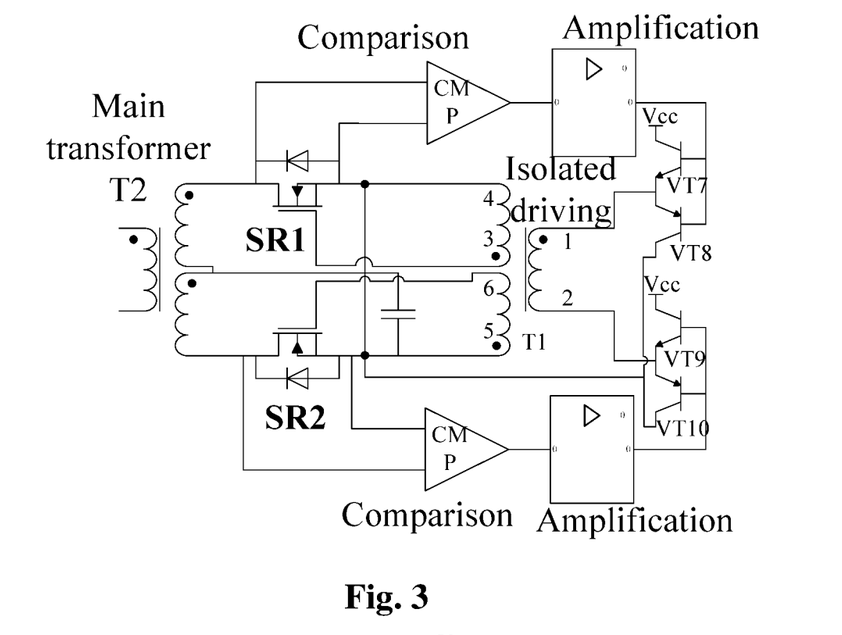
FIG. 3 is a circuit principle diagram of synchronous rectifier driving apparatus provided by an embodiment of the present disclosure.

FIG. 3 is a circuit principle diagram of synchronous rectifier driving apparatus provided by an embodiment of the present disclosure. As shown in FIG. 3, the apparatus includes comparison circuits, amplification circuits and an isolated driving circuit, wherein the comparison circuits compare the magnitudes of source and drain voltages of a synchronous rectifier Metal Oxide Semiconductor (MOS) tube respectively, the amplification circuits amplify signals obtained by comparison to obtain detection signals respectively, and the isolated driving circuit generates an isolated driving signal according to the detection signals, and provides the isolated driving signal for gates and sources of a first synchronous rectifier SR1 and a second synchronous rectifier SR2. The direction of a current flowing through the synchronous rectifier MOS tube can be judged by detecting the source and drain voltages of the synchronous rectifier MOS tube, so that corresponding driving signals of the first synchronous rectifier SR1 and the second synchronous rectifier SR2 are generated.

Specifically, the first synchronous rectifier SR1 and the second synchronous rectifier SR2 perform respective half-wave rectification on a secondary side of the main transformer, and the comparison circuits and amplification circuits of the first synchronous rectifier SR1 and the second synchronous rectifier SR2 are identical. The comparison circuits are configured to compare the source and drain voltages of the first synchronous rectifier SR1 and the second synchronous rectifier SR2 respectively, and the comparison circuits corresponding to the first synchronous rectifier SR1 and the second synchronous rectifier SR2 are identical. The amplification circuits are configured to amplify signals generated by the comparison circuits of the first synchronous rectifier SR1 and the second synchronous rectifier SR2 to obtain detection signals, and the amplification circuits corresponding to the first synchronous rectifier SR1 and the second synchronous rectifier SR2 are identical. The isolated driving circuit is configured to output the detection signals generated by the amplification circuits of the first synchronous rectifier SR1 and the second synchronous rectifier SR2 in a push-pull way, and then the detection signals are input into first and second pins of a primary side of an isolated driving transformer T1, and two secondary windings of the isolated driving transformer perform isolated driving on gates and sources of the corresponding first synchronous rectifier SR1 and the corresponding second synchronous rectifier SR2 according to a phase relationship respectively.

Figure 4:
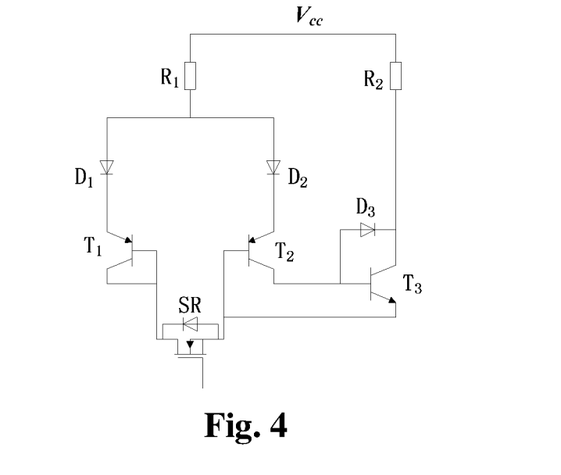
FIG. 4 is a first circuit principle diagram of a detection circuit provided by an embodiment of the present disclosure.
Figure 5:
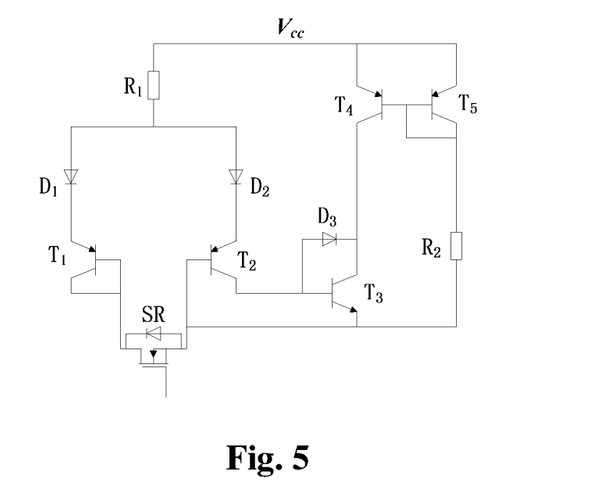
FIG. 5 is a second circuit principle diagram of a detection circuit provided by an embodiment of the present disclosure.

Each comparison circuit includes two triodes and two diodes. As shown in FIG. 4 or FIG. 5, a base and collector of a triode $T_1$ are connected and then coupled to a drain of a synchronous rectifier MOS tube SR, an emitter of the triode $T_1$ is connected to a cathode of a diode $D_1$, a base of a triode $T_2$ is coupled to a source of the synchronous rectifier MOS tube SR, a collector of the triode $T_2$ is coupled to an input end of the corresponding amplification circuit, an emitter of the triode $T_2$ is connected to a cathode of a diode $D_2$, and anodes of the diode $D_1$ and the diode $D_2$ are coupled to an auxiliary power supply via a resistor $R_1$.

Each amplification circuit includes a triode, a diode and a resistor. As shown in FIG. 4, an emitter of a triode $T_3$ is connected to a source of the synchronous rectifier MOS tube SR, a base of the triode $T_3$ and an anode of a diode $D_3$ are each connected to an output end of the corresponding comparison circuit, and a collector of the triode $T_3$ is connected to a cathode of the diode $D_3$ and is connected to the auxiliary power supply $V_{cc}$ via a resistor $R_2$. Or, each amplification circuit includes three triodes, a diode and a resistor. As shown in FIG. 5, an emitter of a triode $T_3$ is connected to a source of the synchronous rectifier MOS tube SR, a base of the triode $T_3$ and an anode of a diode $D_3$ are connected to an output end of the corresponding comparison circuit respectively, a collector of the triode $T_3$ and a cathode of the diode $D_3$ are connected to a collector of a triode $T_4$ respectively, a base of the triode $T_4$ is connected to a base of a triode $T_5$ and a collector of the triode $T_5$ respectively and is connected to the source of the synchronous rectifier MOS tube SR via a resistor $R_2$, and an emitter of the triode $T_4$ and an emitter of the triode $T_5$ are connected to the auxiliary power supply $V_{cc}$.

The isolated driving circuit includes two integrated driving chips and an isolated driving transformer, an input end of each integrated driving chip is coupled to an output end of the corresponding amplification circuit, an output end of the integrated driving chip corresponding to the first synchronous rectifier SR1 is coupled to a first pin of the isolated driving transformer T1, an output end of the integrated driving chip corresponding to the second synchronous rectifier SR2 is coupled to a second pin of the isolated driving transformer T1, third and fourth pins of the isolated driving transformer T1 are connected to the gate and source of the first synchronous rectifier SR1 respectively, and sixth and fifth pins of the isolated driving transformer T1 are connected to the gate and source of the second synchronous rectifier SR2 respectively. Or, the isolated driving circuit includes two push-pull circuits and an isolated driving transformer, a triode VT7 and a triode VT8 corresponding to the first synchronous rectifier SR1 form a push-pull circuit, bases of the triode VT7 and the triode VT8 are coupled to the output end of the amplification circuit corresponding to the first synchronous rectifier SR1 respectively, and emitters of the triode VT7 and the triode VT8 are coupled to a first pin of the isolated driving transformer T1; and a triode VT9 and a triode VT10 corresponding to the second synchronous rectifier SR2 form another push-pull circuit, bases of the triode VT9 and the triode VT10 are coupled to the output end of the amplification circuit corresponding to the second synchronous rectifier SR2, emitters of the triode VT9 and the triode VT10 are coupled to a second pin of the isolated driving transformer T1, third and fourth pins of the isolated driving transformer T1 are connected to the gate and source of the first synchronous rectifier SR1 respectively, and sixth and fifth pins of the isolated driving transformer T1 are connected to the gate and source of the second synchronous rectifier SR2 respectively.

Preferably, the apparatus further includes a first parasitic diode connected between the drain and source of the first synchronous rectifier SRI, an anode of the first parasitic diode is connected to the source of the first synchronous rectifier SR1, and a cathode of the first parasitic diode is connected to the drain of the first synchronous rectifier SR1. The apparatus further includes a second parasitic diode connected between the drain and source of the second synchronous rectifier SR2, an anode of the second parasitic diode is connected to the source of the second synchronous rectifier SR2, and a cathode of the second parasitic diode is connected to the drain of the second synchronous rectifier SR2. The apparatus further includes a capacitor, one end of the capacitor is connected to a centre tap of the secondary winding of the main transformer, and the other end of the capacitor is connected to the source of the first synchronous rectifier SR1 and the source of the second synchronous rectifier SR2 respectively.

As mentioned above, the input ends of the each comparison circuit of the apparatus for driving the synchronous rectifier are coupled to the source and drain of the synchronous rectifier MOS tube, and the output end of the each comparison circuit is coupled to the input end of the amplification circuit; the output end of the amplification circuit is coupled to the input end of the isolated driving circuit; and outputs of the secondary side of the isolated driving transformer of the isolated driving circuit are coupled to the gates and sources of the first synchronous rectifier SR1 and the second synchronous rectifier SR2 respectively. The comparison circuits are configured to compare the source and drain voltages of the synchronous rectifier MOS tube, preferably, a circuit composed of an accurately-matched triode pair and an accurately-matched high-voltage diode pair is adopted, and a result reflects the direction of the current flowing through the synchronous rectifier MOS tube. The amplification circuit amplify the signal output by the comparison circuit. The isolated driving circuit is configured to generate an isolated driving signal according to an amplification result, and transmit the isolated driving signal to the gates and sources of the first synchronous rectifier SR1 and the second synchronous rectifier SR2.

FIG. 4 is a first circuit principle diagram of a detection circuit provided by an embodiment of the present disclosure. As shown in FIG. 4, the detection circuit includes a comparison circuit and an amplification circuit.

The comparison circuit includes a triode $T_1$, a triode $T_2$, a diode $D_1$ and a diode $D_2$. A base and collector of the triode $T_1$ are connected to a drain of a synchronous rectifier MOS tube SR, a base of the triode $T_2$ is connected to a source of the synchronous rectifier MOS tube SR, an emitter of the triode $T_1$ is connected to a cathode of the diode $D_1$, an emitter of the triode $T_2$ is connected to a cathode of the diode $D_2$, anodes of the diode $D_1$ and the diode $D_2$ are connected to an auxiliary power supply $V_{cc}$ via a resistor $R_1$, and a collector of the triode $T_2$ and a base of the triode $T_3$ are connected to an anode of the diode $D_3$.

The amplification circuit includes a triode $T_3$, a diode $D_3$ and a resistor $R_2$. An emitter of the triode $T_3$ is connected to the source of the synchronous rectifier MOS tube SR, a base of the triode $T_3$ and an anode of the diode $D_3$ are connected to the collector of the triode $T_2$, and a collector of the triode $T_3$ is connected to a cathode of the diode $D_3$ and is connected to the auxiliary power supply $V_{cc}$ via the resistor $R_2$.

The circuit composed of the accurately-matched triode pair $T_1$ and $T_2$ and the accurately-matched high-voltage diode pair $D_1$ and $D_2$ compares the drain and source voltages of the synchronous rectifier MOS tube SR, and transmits a signal obtained by comparison to the amplification circuit composed of the triode $T_3$, the diode $D_3$ and the resistor $R_2$, the signal is amplified and then is transmitted to the isolated driving circuit, and an isolated driving signal is generated by the isolated driving circuit and then is transmitted to a gate of the synchronous rectifier MOS tube SR.

FIG. 5 is a second circuit principle diagram of a detection circuit provided by an embodiment of the present disclosure. The difference between the detection circuits shown by FIG. 5 and FIG. 4 is the amplification circuit. As shown in FIG. 5, the amplification circuit includes a triode $T_3$, a triode $T_4$, a triode $T_5$, a diode $D_3$ and a resistor $R_2$. An emitter of the triode $T_3$ is connected to the source of the synchronous rectifier MOS tube SR, a base of the triode $T_3$ and an anode of the diode $D_3$ are connected to the collector of the triode $T_2$ respectively, a collector of the triode $T_3$ and a cathode of the diode $D_3$ are connected to a collector of the triode $T_4$, a base of the triode $T_4$ is connected to a base of the triode $T_5$ and a collector of the triode $T_5$ respectively and is connected to the source of the synchronous rectifier MOS tube SR via the resistor $R_2$, and an emitter of the triode $T_4$ and an emitter of the triode $T_5$ are connected to the auxiliary power supply $V_{cc}$.

Figure 6:
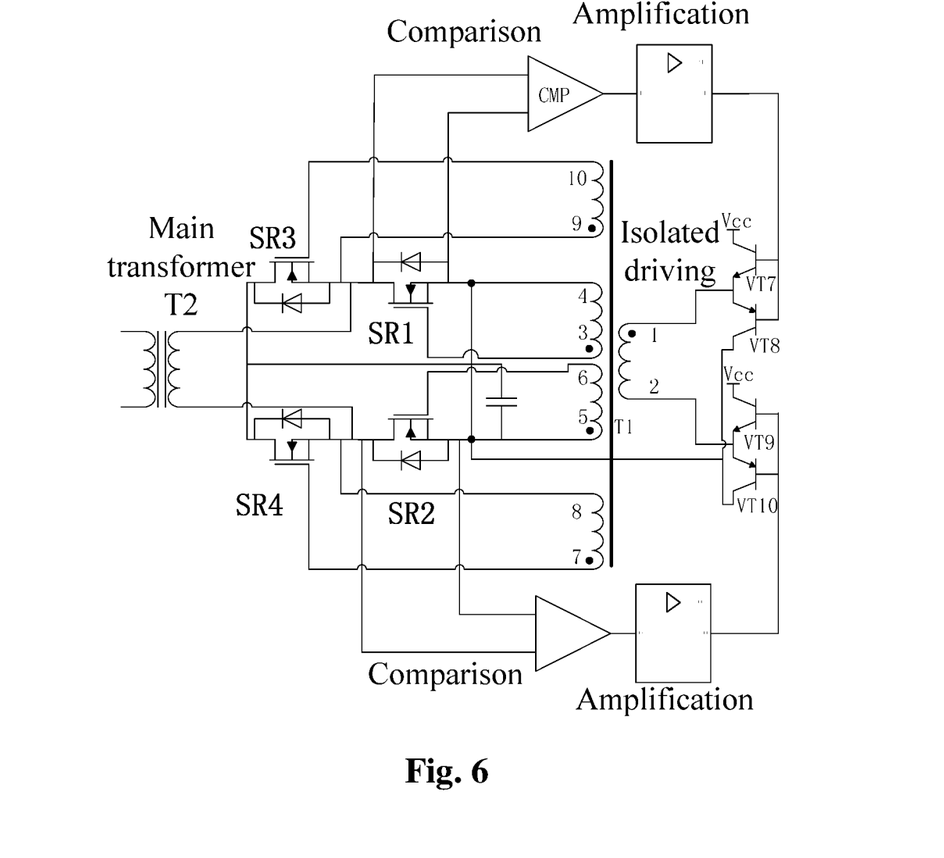
FIG. 6 is a principle diagram of a full-bridge synchronous rectifier circuit provided by an embodiment of the present disclosure.

FIG. 6 is a principle diagram of a full-bridge synchronous rectifier circuit provided by an embodiment of the present disclosure. The difference between the circuits shown by FIG. 6 and FIG. 3 is as follows. In the embodiment, a secondary side of a main transformer T2 is a single winding, the full-bridge synchronous rectifier circuit is composed of four synchronous rectifiers SR1, SR2, SR3 and SR4, and the isolated driving transformer is provided with four secondary windings for driving the four synchronous rectifiers respectively. As shown in FIG. 6, in the embodiment, double tubes SR1 and SR2 form comparison circuits and amplification circuits, an input end of the full-bridge synchronous rectifier circuit is connected to the single winding of the secondary side of the main transformer T2, the drain and source voltages of the two synchronous rectifiers SR1 and SR2 on one of input branch circuits are compared by using the comparison circuits respectively, and comparison results are amplified by using the amplification circuits to obtain two detection signals corresponding to the synchronous rectifiers SR1 and SR2 respectively. The detection signal corresponding to the synchronous rectifier SR1 is output to a push-pull circuit composed of VT7 and VT8, the detection signal corresponding to the synchronous rectifier SR2 is output to a push-pull circuit composed of VT9 and VT10, and outputs of the two push-pull circuits are connected to first and second pins of a primary winding of the isolated driving transformer respectively. The secondary side of the isolated driving transformer adopts four windings. According to polarity situations of primary and secondary sides, third and fourth pins of the isolated driving transformer T1 are connected to the gate and source of the synchronous rectifier SR1 respectively, sixth and fifth pins of the isolated driving transformer T1 are connected to the gate and source of the synchronous rectifier SR2 respectively, tenth and ninth pins of the isolated driving transformer T1 are connected to the gate and source of the synchronous rectifier SR3 respectively, and seventh and eighth pins of the isolated driving transformer T1 are connected to the gate and source of the synchronous rectifier SR4 respectively.

The circuits shown in FIG. 4 or FIG. 5 may be selected as the comparison circuit and the amplification circuit.

Preferably, the apparatus further includes four parasitic diodes, each parasitic diode is connected to the corresponding synchronous rectifier, an anode of each parasitic diode is connected to a source of the corresponding synchronous rectifier, and a cathode of this parasitic diode is connected to a drain of this synchronous rectifier. The apparatus further includes a capacitor, one end of the capacitor is connected to drains of the synchronous rectifiers SR3 and SR4 respectively, and the other end of the capacitor is connected to sources of the synchronous rectifiers SR1 and SR2 respectively.

As mentioned above, in the embodiment of the present disclosure, the direction of the current flowing through the synchronous rectifier is judged by detecting the source and drain voltages of the synchronous rectifier, so that the isolated driving signal of the corresponding synchronous rectifier is generated, thereby acquiring the isolated driving signals of the synchronous rectifier more simply and effectively.

Although the present disclosure is described above in detail, the present disclosure is not limited thereto. Those skilled in the art can make various modifications according to the principle of the present disclosure. Thus, the modifications made according to the principle of the present disclosure shall fall within the protection scope of the present disclosure.

INDUSTRIAL APPLICABILITY

As mentioned above, the apparatus and method for driving the synchronous rectifier provided by the embodiment of the present disclosure have the beneficial effects as follows. In the embodiment of the present disclosure, the direction of the current flowing through the synchronous rectifier is judged by detecting the source and drain voltages of the synchronous rectifier, so that the isolated driving signal of the corresponding synchronous rectifier is generated, thereby acquiring the isolated driving signal of the synchronous rectifier more simply and effectively.

What is claimed is:

1. Apparatus for driving synchronous rectifiers, comprising:
   detection circuits, wherein each of the detection circuits are configured to detect drain and source voltages of one of the synchronous rectifiers to obtain a detection signal for indicating a current direction in the one of the synchronous rectifiers;
   an isolated driving circuit configured to generate isolated driving signals for driving the synchronous rectifiers according to the detection signals output by the detection circuits; and
   the synchronous rectifiers configured to synchronously rectify input signals from a main transformer by using the isolated driving signals;
   wherein the apparatus comprises two synchronous rectifiers, each of the two synchronous rectifiers being connected to a secondary winding of the main transformer and one of the detection circuits respectively;
   the isolated driving circuit comprises two push-pull circuits and an isolated driving transformer, wherein an input end of each of the two push-pull circuits is connected to one of the detection circuits; and a primary winding of the isolated driving transformer is connected to output ends of the two push-pull circuits, and each of two secondary windings of the isolated driving transformer is connected to a gate and source of one of the two synchronous rectifiers;
   wherein each of the detection circuits comprise: a comparison circuit, wherein an input end of the comparison circuit is connected to a drain and source of the one of the synchronous rectifiers; and
   an amplification circuit, wherein an input end of the amplification circuit is connected to the comparison circuit, and an output end of the amplification circuit is connected to one of the two push-pull circuits.

2. The apparatus according to claim 1, wherein the apparatus comprises a full-bridge rectifier circuit formed by four synchronous rectifiers; input ends of the full-bridge rectifier circuit are connected to the secondary windings of the main transformer; and a synchronous rectifier, of which the source is grounded, in the two synchronous rectifiers in each input branch circuit of the full-bridge rectifier circuit is connected to one of the detection circuits.

3. The apparatus according to claim 2, wherein the isolated driving circuit comprises two push-pull circuits and an isolated driving transformer, wherein
   an input end of each of the two push-pull circuits is connected to the one of the detection circuits; and
   a primary winding of the isolated driving transformer is connected to output ends of the two push-pull circuits, and each of four secondary windings of the isolated driving transformer is connected to a gate and source of the one of the synchronous rectifiers.

4. The apparatus according to claim 1, wherein each of the comparison circuits comprises a first comparison branch circuit and a second comparison branch circuit; one end of the first comparison branch circuit and one end of the second comparison branch circuit are connected to an auxiliary power supply via a first resistor;
   the first comparison branch circuit comprises:
   a first triode, wherein a base and collector of the first triode are connected to the drain of the one of the synchronous rectifiers;
   a first diode, wherein a cathode of the first diode is connected to an emitter of the first triode, an anode of the first diode is connected to the first resistor;
   the second comparison branch circuit comprises:
   a second triode, wherein a base of the second triode is connected to the source of the one of the synchronous rectifiers, a collector of the second triode is connected to the amplification circuit; and
   a second diode, wherein a cathode of the second diode is connected to an emitter of the second triode, an anode of the second diode is connected to the first resistor.

5. A method for driving synchronous rectifiers, comprising:
   detecting drain and source voltages of each of the synchronous rectifiers to obtain detection signals for indicating current directions in the synchronous rectifiers;
   generating isolated driving signals for driving the synchronous rectifiers according to the obtained detection signals; and
   synchronously rectifying input signals from a main transformer by using the isolated driving signals;
   wherein obtaining the detection signals for indicating the current directions in the synchronous rectifiers comprises:
   comparing the drain and source voltages of one of the synchronous rectifiers by using a comparison circuit; and
   amplifying an output of the comparison circuit by using an amplification circuit to obtain the detection signal for indicating the current direction in the one of the synchronous rectifiers.

6. The method according to claim 5, wherein generating the isolated driving signals for driving the synchronous rectifiers comprises:
   outputting the detection signals to an isolated driving transformer in a push-pull way by using a push-pull circuit, in order that the isolated driving transformer generates the isolated driving signals for driving the synchronous rectifiers.

7. The apparatus according to claim 1, wherein each of the comparison circuits comprises a first comparison branch circuit and a second comparison branch circuit; one end of the first comparison branch circuit and one end of the second comparison branch circuit are connected to an auxiliary power supply via a first resistor;

the first comparison branch circuit comprises:
- a first triode, wherein a base and collector of the first triode are connected to the drain of the one of the synchronous rectifiers;
- a first diode, wherein a cathode of the first diode is connected to an emitter of the first triode, an anode of the first diode is connected to the first resistor;

the second comparison branch circuit comprises:
- a second triode, wherein a base of the second triode is connected to the source of the one of the synchronous rectifiers, a collector of the second triode is connected to the amplification circuit; and
- a second diode, wherein a cathode of the second diode is connected to an emitter of the second triode, an anode of the second diode is connected to the first resistor.

8. The method according to claim 5, wherein generating the isolated driving signals for driving the synchronous rectifiers comprises:
- outputting the detection signals to an isolated driving transformer in a push-pull way by using a push-pull circuit, in order that the isolated driving transformer generates the isolated driving signals for driving the synchronous rectifiers.

* * * * *